United States Patent [19]

Huber et al.

[11] Patent Number: 4,731,398

[45] Date of Patent: Mar. 15, 1988

[54] THERMOSETTING ADHESIVE AND SEALANT COMPOSITIONS

[75] Inventors: Hans Huber, Lohmar; Norbert Vollkommer, Troisdorf-Kriegsdorf, both of Fed. Rep. of Germany

[73] Assignee: Dynamit Nobel AG, Cologne, Fed. Rep. of Germany

[21] Appl. No.: 928,530

[22] Filed: Nov. 7, 1986

[30] Foreign Application Priority Data

Nov. 8, 1985 [DE] Fed. Rep. of Germany ....... 3539593

[51] Int. Cl.$^4$ ...................... C08L 67/02; C08L 67/06; C08G 63/46
[52] U.S. Cl. ...................... 523/500; 525/10; 525/25; 525/27; 525/39; 525/48
[58] Field of Search ........ 525/10, 25, 27, 39, 525/48; 523/500

[56] References Cited

U.S. PATENT DOCUMENTS 3,966,836  6/1976  De Cleur ........................... 525/438
4,562,225  12/1985  Huber ................................. 524/602

FOREIGN PATENT DOCUMENTS 3402280  7/1985  Fed. Rep. of Germany .

*Primary Examiner*—Patricia A. Short
*Attorney, Agent, or Firm*—Felfe & Lynch

[57] ABSTRACT

Disclosed is a thermosetting adhesive and sealant composition of:

20 to 60 wt. % of carboxyl-group-terminated polyesters with preferably at least two carboxyl groups per molecule, with a glass transition temperature below 20° C., 2 to 12 wt. % of polyoxazolines which contain at least two oxazoline groups per molecule, 2 to 40 wt. % of acrylic or methacrylic esters, preferably of polyvalent alcohols, and/or allyl esters of polyvalent carboxylic acids, which can contain preferably peroxides or aliphatic azo compounds as radical formers and, if desired, paraffin and reactive or nonreactive diluents and additives.

16 Claims, No Drawings

THERMOSETTING ADHESIVE AND SEALANT COMPOSITIONS

BACKGROUND OF THE INVENTION

The present invention is in a composition which is a thermosetting adhesive and sealant.

DE-OS No. 34 02 280 describes thermosetting adhesive and sealant compositions consisting of:
(a) 70 to 95 wt.-% polyesters with at least two carboxyl terminal groups and glass transition temperatures below 20° C.;
(b) 5 to 30 wt.-% polyoxazolines which are suspended in the polyesters;
(c) 0 to 4 wt.-% paraffin, plus, if desired;
(d) 1 to 50 wt.-% reactive or nonreactive diluents and/or additives.

The compositions described in DE-OS No. 34 02 280 have good mechanical properties and good adherence even to steel that has not been degreased. However, the user's need for applicability at room temperature is not satisfied because the compositions are semisolid or not sufficiently liquid. If for economic reasons fillers are added, the fluidity of the adhesive paste is not sufficient even at 50° to 90° C. for heated spray guns, for example. Furthermore, the hot adhesive is poorly "accepted" on cold surfaces of sheet steel that has not been degreased.

Nonreactive diluents, which can be added in amounts that still do not impair the properties of the set adhesive compositions, result in adhesives whose application temperature is 50° C. or higher. Reactive diluents participate in the crosslinking, having a high inherent viscosity, and thus do not improve fluidity.

The problem therefore was to develop a thermosetting binder system for use as an adhesive and sealant composition which could be applied at room temperature with any conventional applicator apparatus and which is entirely free of volatile solvents. Such a composition should also have a shelf life, adhesion and mechanical properties at least equal to those of the compositions according to DE-OS No. 34 02 280.

THE INVENTION

These demanding requirements are satisfied by the thermosetting compositions of the invention.

The composition of the invention is in a thermosetting adhesive and sealant. The composition comprises
(a) 20 to 60 wt.-%, preferably 25 to 55 wt.-%, of carboxyl-group-terminated polyesters with a glass transition temperature below 20° C.;
(b) 2.0 to 12 wt.-%, preferably 3 to 8 wt.-%, of polyoxazolines which contain at least 2 oxazoline groups per molecule, the polyoxazolines being suspended in the polyesters;
(c) 2 to 40 wt.-%, preferably 3 to 30 wt.-%, of acrylic or methacrylic esters, preferably of polyvalent alcohols and/or allyl esters of polyvalent carboxylic acids[X] including carbonic acid[X], in the form, if desired, of mixtures of these compounds;

X=polyvalent carboxylic acid means an organic acid, preferably deriving from an alkane or an alkene, bearing two or more groups —COOH, carbonic acid means the unstable acid (HO)$_2$C=O.

(d) 0 to 5 wt.-%, preferably 0.2 to 3 wt.-%, of peroxides or aliphatic azo compounds as radical formers;
(e) 0 to 4 wt.-%, preferably 0.5 to 2 wt.-%, of paraffin and, if desired, additionally;
(f) 1 to 60 wt.-%, preferably 1 to 50 wt.-%, with respect to the total amount of the components, of reactive or nonreactive diluents and/or additives.

The carboxyl-group-terminated polyesters (a), with glass transition temperatures[X] below 20° C., preferably below 10° C., and the polyoxazolines (b), with at least 2 oxazoline groups per molecule, preferably bisoxazolines which under addition polymerization conditions crosslink the polyesters by the reaction of the oxazoline groups with the carboxyl groups, as well as the paraffins, are in general the same substances as disclosed in DE-OS No. 34 02 280.

X=the glass transition temperature is measured according to ASTM D 3818-82

According to the invention, component (c) consists of acrylic or methacrylic esters, preferably polyvalent alcohols, or allyl esters, preferably polyvalent carboxylic acids including carbonic acid, which are capable, upon thermal initiation, of building up a network by breaking the double bond by crosslinking radical polymerization, preferably in the presence of peroxides or aliphatic azo compounds (component d).

In some cases, additional reactive or nonreactive diluents and/or fillers and/or additives (component f) are present, in amounts of 1 to 60 wt.-% with respect to 100% of the weight of components (a) to (f).

It was to be expected that the reactivity of a system, whose operation is based on the fact that the oxazoline group of the crosslinking agent can react unimpeded with the carboxyl groups of the polyester, would be greatly impaired or eliminated. The reaction described by T. Seagusa et al (Makromolekuls, 10, 236 (1977)) would, if applied to the present system, result in the consumption of the bisoxazoline by the acrylic or methacrylic esters and present or interfere with the crosslinking of the polyester. On the other hand, it was to be expected that, if this system were to be used, the shelf life and fluidity of the adhesive compositions would be impaired by post-reaction on account of component (c) and the diffusion processes as well as the possibilities of reaction which it facilitates. Neither of these expectations has been realized.

The setting of the adhesive compositions modified with acrylate according to the invention takes place without difficulty, for example under setting conditions like those of the acrylate-free system according to DE-OS No. 34 02 280. Furthermore, it is of great advantage that the compositions according to the invention containing the component (c) will, in the presence of initiators composed of peroxides or azo compounds with a low degration range beginning at 60° C., gel in a few minutes at temperatures of 60° to 90° C. and can be partially set to an initial strength of up to 30% of the later final strength. This is important for construction purposes. Acrylate-free adhesives, on the other hand, require several minutes at 140° C., for example, to develop the same initial strength.

Even though peroxides and azo compounds have a crosslinking effect in the system, compositions which are liquid at room temperature are obtained. In the set state, the compositions according to the invention, with contents of component (c), have considerably higher adhesive values (for tensile strengths see Table) than the compositions according to DE-OS No. 34 02 280.

The glass transition temperature of the fully hardened adhesive compositions, as a measure of the cold strength of the adhesive or sealant layers, ranges from −25° to −45° C.

Another advantage of the compositions according to the invention is the decidedly lower moisture absorption of the fully set adhesive compositions in a humid atmosphere, and the thus-improved dimensional stability of the bond. While the moisture absorption of the fully set compositions which do not contain component (c) amounts of 7 to 9% in the state of equilibrium in a humid atmosphere (100% rel. humidity at 35° C.), the moisture absorption of the compositions according to the invention, in the preferred range of the content of component (c), is only between 2.5 and 5%.

The shelf life of the adhesive compositions is good or improved and amounts to more than 6 months at room temperature. Surprisingly, the stability of the bond against aqueous salt solutions is greatly improved.

The following can be used as polyester components (a) of the adhesive compositions: condensation polymers on the basis of aromatic dicarboxylic acids with an aromatic ring and/or aliphatic dicarboxylic acids with 3 to 12 carbon atoms, terephthalic and isophthalic acid, glutaric acid, succinic acid and adipic acid, azelaic acid, sebacic acid, decanedicarboxykic acid and dimeric fatty acids (prepared by Diels-Alder reaction from linolic acid and hydrogenated or partially hydrogenated if desired), which can also contain, up to 45 wt.-% of the total amount of polyols, of trimeric fatty acid, or their polyester-forming derivatives, and on the basis of aliphatic or cycloaliphatic diols, such as ethylene glycol, diethylene glycol, neopentyl glycol, butanediol, hexanediol, cyclohexanedimethanol, and if desired trivalent alcohols such as trimethylol propane, $^X$ Preferred polyesters are condensation polymers on the basis of succinic acid, glutaric acid, adipic acid and dimeric fatty acid or their mixtures as dicarboxylic acid components, and of ethylene glycol, diethylene glycol and neopentyl glycol as diol components, with glass transition temperatures under 20° C., preferably under 10° C. The polyesters prepared by the process of fusion polycondensation, which are liquid or semisolid at room temperature or transformable to the molten state by heating up to 90° C., have, immediately after synthesis, mainly hydroxyl terminal groups (the hydroxyl number ranges from 10 to 60, preferably 20 to 40 mg KOH/g, and the acid number from 0 to 9, preferably 0 to 5 mg KOH/g). After the so-called acidification with a dicarboxylic acid anhydride, preferably trimellitic acid anhydride, they have acid numbers ranging from 20 to 120, preferably 40 to 80 mg KOH/g. The acidification process consists in reacting the polyester components with an acid anhydride for the purpose of introducing carboxyl groups. The hydroxyl groups of the polyester then react with the acid anhydride group to form carboxyl groups. The reaction takes place at elevated temperature. In the present invention it can be performed before or during the setting.

X=preferably up to 25 wt.-% of said total amount of polyols.

In addition to the above-named trimellitic acid anhydride, other saturated or unsaturated aliphatic, cycloaliphatic or aromatic polycarboxylic acid anhydrides can be used for the acidification within the scope of this invention, such as, for example, succinic acid anhydride, maleic acid anhydride, phthalic acid anhydride, hexahydrophthalic acid anhydride or tetrahydrophthalic acid anhydride.

The least amount of trimellitic acid anhydride (TMA)—in limited amounts—that is necessary for the acidification of the terminal hydroxyl groups of the polyesters is adapted stoichiometrically according to the invention to the amount of hydroxyl terminal groups that is given by the hydroxyl number of the polyester. It has proven to be advantageous to the overall properties of the adhesive and sealant compositions as well as to their setting, to use a stoichiometric excess of TMA with respect to the hydroxyl terminal groups, in the range of from 1 to 20, preferably 5 to 10, mole-%, in order to achieve a somewhat more tightly meshed crosslinking of the compositions, and in order to compensate for any small percentage of free trimellitic acid that may be present in the TMA used but incompletely react with the hydroxyl groups under the reaction conditions. The acidification of the products which occur in the synthesis, mainly in the form of polyesters containing hydroxyl terminal groups, can be performed in the reaction vessel in the conventional manner by the addition of TMA immediately after the polycondensation in the temperature range of 100° to 200° C., preferably 120° to 180° C. It has proven to be an alternative offering certain advantages to refrain from performing the reaction of the hydroxyl groups with the anhydride groups and to physically mix the TMA together with the other reaction components and additives into the polyester containing the hydroxyl groups. Under the setting conditions, in addition to the above-described crosslinking reaction (of the carboxyl groups with the oxazoline groups), the addition of the TMA onto the hydroxyl terminal groups of the polyester takes place, with the formation of the carboxyl groups on the latter.

Polyesters terminated with carboxyl groups by both procedures yield comparably hardened end products. For the crosslinking of the polyesters containing carboxyl groups, polyfunctional oxazolines are used preferentially, such as for example 1,4-bis($\Delta^2$-oxazolinyl-2-)-benzene=p-phenylene bis-oxazoline; 1,3-bis($\Delta^2$-oxazolinyl-2-)-benzene=m-phenylene-bis-oxazoline; 1,2,4-tris-($\Delta^2$-oxazolinyl-2-)-benzene; bis-($\Delta^2$-oxazolinyl-2-)-butane=tetramethylene-bisoxazoline, or mixtures of the above-named polyfunctional oxazolines. Highly preferred is p-phenylene-bis-oxazoline.

The carboxyl groups of the polyesters R—COOH react with oxazoline groups, with addition and opening of the oxazoline ring and formation of ester amide groups according to the formula:

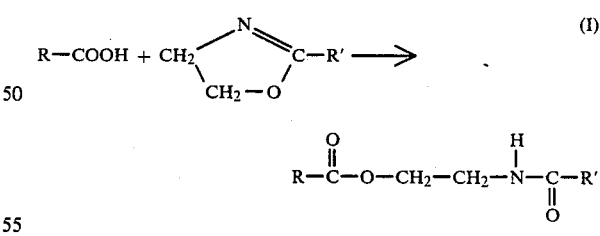

(I)

wherein R' is any organic moiety, preferably the bi- or trifunctional moiety of benzene or of alkanes of 3 to 6 carbon atoms.

The amount of bisoxazoline that is to be used can be within the range of the equivalence given on the basis of the stoichiometry of the crosslinking reaction: one carboxyl group reacts with one oxazoline group.

For considerations, such as setting speed, degree of cure, and sensitiviey of the system to moisture and additives, and for the sake of the final properties of the adhesive and sealant compositions, it is advantageous to use a stoichiometric excess of oxazoline groups in the range of from 1 to 30 mole-%, preferably 15 to 25 mole-%, with respect to the carboxyl groups.

The acrylic esters, methacrylic esters of alkyl esters of component (c) contain preferably two, and in some cases three or four, of the unsaturated groups per molecule.

The acrylic or methacrylic esters, preferably of polyvalent alcohols, can be the bisacrylates or bismethacrylates of ω,ω-dihydroxyl alkanes of the general formula II:

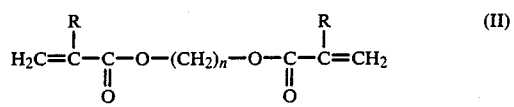

wherein R=H or the CH$_3$ moiety and n=2 to 12. Preferred among the representatives of structural formula II are ethylene glycol diacrylate or ethylene glycoldimethacrylate, propanediol-1,3-diacrylate or propanediol-1,3-dimethacrylate, butanediol-1,4-diacrylate or butanediol-1,4-dimethacrylate, hexanediol-1,6-diacrylate or hexanediol-1,6-dimethacrylate, as well as nonanediol-1,9-diacrylate or nonanediol-1,9-dimethacrylate.

Greatly preferred are butanediol-1,4-diacrylate and hexanediol-1,6-diacrylate.

Also suitable are the diesters of (meth-)acrylic acid with oligo- or polyalkylene oxides, i.e., diesters of the di-bis-polyethylene glycols and propylene glycols with molecular weights of about 80 to 500, preferably about 80 to 300.

Another group of bisacrylates or bismethacrylates is derived from ethoxylated bisphenols as diol components and has the structural formula III:

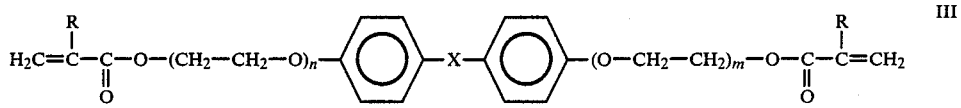

wherein R represents hydrogen or a methyl group and X can be a bivalent organic moiety such as, preferably:

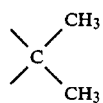

or a hetero atom such as oxygen, sulfur, or also a group, such as

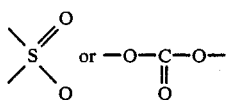

and n and m are whole numbers from 1 to 30, preferably 3 to 20.

Acrylic acid esters or methacrylic acid esters of bivalent to tetravalent aliphatic alcohols, such as the acrylates or methacrylates of trimethylolpropane or of pentaerythritol, for example, can be used, preferably in mixture with the above-named acrylates or methacrylates of the bivalent alcohols.

Suitable bis-allyl esters of polyvalent dicarboxylic acids, alone or together with the above-named (meth)acrylates are, for example, those of aromatic dicarboxylic acids, such as phthalates, iso- or terephthalates, cyclohexane dicarboxylic and tricarboxylic acids, or aliphatic dicarboxylic acids with 2 to 12 carbon atoms, as well as carbonic acid. Diallyl phthalate and diallyl carbonate are preferred.

A portion of component (c), preferably from 0 to half of the weight of component (c), can consist of monoacrylates or monomethacrylates or polyvalent alcohols with 2 to 12 carbon atoms, or (meth)acrylates or monovalent, straight-chain or branched aliphatic or cycloaliphatic alcohols with 2 to 20 carbon atoms, or monoesters and diesters of unsaturated dicarboxylic acids of 3 to 8 carbon atoms, such as fumaric acid, with these alcohols. In this manner, for example, the elasticity and hardness of the compositions after setting, can be adapted to requirements. Preferred acrylates or methacrylates of monovalent alcohols are the acrylic or methacrylic ethyl to hexyl esters, 2-ethylhexyl esters or cyclohexyl esters, or nonyl to cetyl esters, and, as mono-(meth)acrylates of diols, those of propanediol to hexanediol.

The substances of component (c) can be crosslinked thermally to set them, but crosslinking by the addition of initators and radical formers (d) is preferred. Suitable initiators for the radical polymerization of the acrylic or methacrylic esters or of the allyl esters, are radical formers of a kind known in itself, especially peroxides or aliphatic azo compounds. For the sake of the shelf life of the adhesive pastes at room temperature, initiators are preferred which form radicals at temperatures of 70° C. to 180° C. It may be advantageous, however, to use initiators with degradation temperatures of 60° to 80° C. in order to obtain high initial strengths. In this case, two initiators with different degradation temperatures can be used, e.g., a peroxide for gelling at 70° to 90° C. mixed with a peroxide of higher degradation temperature to complete the radical crosslinking in the temperature range from 140° to 180° C.

The incorporation of 0 to 4 wt.-%, preferably 1 to 3 wt.-% of paraffin (component e) produces excellent hardening in the case, for example, of adhesive mixtures which are exposed for long periods to the atmosphere.

The additives and fillers (f) are, for example, talc, heavy spar, chalk, carbon black or the like, finely divided.

Good nonreactive diluents have proven to be, for example, liquid coumarone-indene resins or plasticizers having an ester structure, especially phthalates such as dioctyl phthalate, or high-boiling fractions of especially aromatic hydrocarbons, or polyglycols such as tripropylene glycol or polyethylene glycol.

Examples of reactive diluents are acidified compounds of a polyol character, such as for example reaction products of an acid anhydride, such as trimellitic anhydride with polyethylene glycols or reaction products of TMA with hydroxyl-group-terminated oligomers or polymers or copolymers of butadiene, or liquid compounds which are dicarboxylic acids by nature, such as the dimeric fatty acids obtained from unsaturated fatty acids, which act as diluents and with their carboxyl function participate in the crosslinking.

The paste-like adhesive and sealant compositions are prepared in a manner known in itself, by mixing together the components, preferably in kneaders or roller mills.

The setting takes place at temperatures above 100° C., preferably in the temperature range from 120° to 180° C. The setting time ranges from 10 minutes to one hour. Thermal stress above 180° C. for a few hours, up to 240° C. for 2 hours, does not impair the quality of the bond or seal.

EXAMPLE 1 (POLYESTER)

To prepare a polyester (a) with a low glass transition temperature, the following condensation components were weighed into a heatable metal vessel equipped with stirrer, nitrogen feed tube, and an (alternately usable) dephlegmator and a descending cooling system:

| | |
|---|---|
| 6,862 g adipic acid | (47 mol) |
| 1,692 g dimeric fatty acid[1] | (3 mol) |
| 2,886 g ethylene glycol | (46.5 mol) |
| 1,325 g diethylene glycol | (12.5 mol) |

[1]Dimeric fatty acid is a product with an average molecular mass of 564 prepared by Diels-Alder reaction from linolic acid. It has a better than 85 wt. % dicarboxylic acid character, and contains 10 to 12 wt. % of tricarboxylic acids and 1 to 2 wt. % of monocarboxylic acid.

The reaction mixture is heated, with stirring and under a slow current of nitrogen, using the route through the dephlegmator (temp. 110° C.), and esterified at 180°, 200° and 220° C. for one hour each, while distilling out the reaction water.

Then 10.4 g of triphenyl phosphite is added as antoxidant, and after another hour at 240° C., and a changeover is made to the descending cooling system (short route).

After the addition of 5.2 g of octylene glycol titanate (content 0.05 g per g of octylene glycol titanate [sic]) as condensation catalyst, the temperature is increased to 250° C. and the vacuum is lowered over a period of 1 hour to 1 mbar.

The mixture is polycondensed until the following characteristics are achieved:

$\eta sp/_c$ (reduced spec. viscosity) = 0.25 dl/g
Acid number = 0.3 mg KOH/g
Hydroxyl number = 31 mg KOH/g After the mass has cooled to 180° C., 1,330 g of trimellitic anhydride is added to convert terminal hydroxyl groups to carboxylic groups, and stirred in the temperature range of 170° to 180° C.

Then carboxyl-group-terminated polyester is let out of the reaction vessel with the following characteristics:
$\eta sp/_c = 0.26$ dl/g
Acid number = 56 mg KOH/g
Hydroxyl number < 1 mg KOH/g
Glass transition temperature = −34° C.

EXAMPLE 2 (POLYESTER)

Another carboxyl-group-terminated polyester of a lower glass transition temperature is prepared by the procedure of Example 1, with the following reaction components:

| | |
|---|---|
| 6,392 g aliphatic dicarboxylic acid mixture[2] | (approx. 47 mol) |
| 1,692 g dimeric fatty acid[1] | (3 mol) |
| 2,886 g ethylene glycol | (46.5 mol) |
| 1,300 g neopentyl glycol | (12.5 mol) |

[2]The dicarboxylic acid mixture is composed as follows: 28 to 33 wt. % succinic acid, 40 to 45 wt. % glutaric acid and 24 to 28 wt. % adipic acid.

Under the conditions of Example 1, with the addition of 10.4 g of triphenyl phosphite as antoxidant and 5.2 g of octylene glycol titanate as polycondensation catalyst, a polyester is produced with the following characteristics:
$\eta sp/_c = 0.28$ dl/g
Acid number = 0.4 mg KOH/g
Hydroxyl number = 25 mg KOH/g After the reaction with 1,100 g of trimellitic anhydride at 170° to 180° C., a carboxyl-group-terminated polyester is obtained with the following characteristics:
$\eta sp/_c = 0.29$ dl/g
Acid number = 46 mg KOH/g
Hydroxyl number < 1 mg KOH/g
Glass trans. temp. = −29° C.

EXAMPLES FOR PURPOSES OF COMPARISON AND EXAMPLES 3 TO 28

For the preparation of the adhesive pastes of Comparison Examples A to H and those of Examples 3 to 28, the weights of the components given in Tables 1 to 3 are mixed by placing the carboxyl-group-terminated polyester and the paraffin in an evacuable and heatable planetary mixer, and, after evacuating the mixing chamber and heating to 65° to 70° C., mixing them vigorously. With stirring, the mass is cooled down to 35° C. After shutting off the stirrer and letting air into the mixing chamber, the additional components listed in the tables are added, the mixing chamber is evacuated, and the stirrer is turned on and, in a temperature range of 20° to 40° C., the adhesive paste is mixed until it is completely homogenized.

The properties listed in the tables were obtained as follows:

1. Paste fluidity:
   (a) semiquantitatively by judging spreadability when the paste is brushed onto the steel sheets,
   (b) quantitatively, the rate of flow and velocity of flow through a nozzle of 4 mm diameter at 23° C. from a filled cartridge while applying a pressure of 5,000 g vertically downward.

2. The shelf life of the adhesive pastes at room temperature (to help prevent premature crosslinking) by comparing the gelling times at 120° C. one hour after the paste is made, and 30 days and 60 days after the paste is made.

3. Tensile shear strength in N/sq.cm. after setting. A nondegreased steel sheet (St 37) is coated with the paste (coating thickness 0.8 mm, adhesive area 5 cm$^2$) and a second steel plate (overlap width 20 mm, overlap length 25 mm) is applied. The setting is performed in a circulating air oven for 28 minutes at 180° C. The tensile shear strength was measured at 23° C. and at a pulling speed of 50 mm/min according to DIN 53 283.

4. Tensile shear strength in N/cm$^3$ after climatic change. The stability of the bond in the climatic change test was tested on cured, glued steel plates as in par. 3 by alternating the temperature from +80° C. at 80% relative atmospheric humidity with a temperature of −40° C. (four cycles of four hours each) according to Test P 1200 of the "Volkswagen AG", West Germany.

5. Detachment of the glue layer in the salt spray test. A layer of the adhesive (1 mm thick, 15 mm wide and 50 mm long) was applied to a steel plate and cured as in 3. This steel plate is sprayed in a test chamber, at 35° C. with a solution of 50 g of sodium chloride in 1,000 cu.cm. of water for 8 days (steel plate vertical, spray angle 20°). The length in mm from the edge, on which the glue is released or detached from the plate is measured (infiltration).

6. Moisture absorption of the cured glue layer. Test bodies as described in 5 were exposed in a test chamber for 5 days to an atmosphere of 100% relative humidity at 35° C. The moisture content of the glue layer is measured in percent.

TABLE 1

| Amounts given are parts by weight | A | B | C | D | 3 | 4 | 5 | 6 | 7 | 8 | 9 | 10 |
|---|---|---|---|---|---|---|---|---|---|---|---|---|
| Polyester, COOH—terminated according to Example 1 | 48 | 48 | 45 | 46 | 48 | 48 | 48 | 46 | 45 | 45 | 43 | 38 |
| Paraffin, solidification pint 56 to 58° C. | 1 | 1 | 1 | 1 | 1 | 1 | 1 | 1 | 1 | 1 | 1 | 1 |
| m-phenylenebisoxazoline | 6 | — | — | — | 6 | — | — | — | — | — | — | — |
| p-Phenylene bisoxazoline | — | 6 | 5 | 6 | — | 6 | 6 | 6 | 5 | 5 | 5 | 5 |
| Dioctylphthalate | 10 | 10 | 4 | 7 | — | — | — | — | — | — | — | — |
| Chalk | 35 | 35 | — | — | 35 | 35 | 35 | 35 | 35 | 35 | — | — |
| Talc | — | — | — | 40 | — | — | — | — | — | — | 40 | — |
| Heavy spar | — | — | 45 | — | — | — | — | — | — | — | — | 45 |
| Butanediol diacrylate | — | — | — | — | 9 | 9 | — | — | — | — | 10 | 10 |
| Butanediol dimethacrylate | — | — | — | — | — | — | 9 | — | — | — | — | — |
| Triethylene glycol dimethacylate | — | — | — | — | — | — | — | 11 | — | — | — | — |
| Timethylolpropane trimethacylate | — | — | — | — | — | — | — | — | 13 | — | — | — |
| Diallylphthalate | — | — | — | — | — | — | — | — | — | 13 | — | — |
| Peroxide: Dicumylperoxide | — | — | — | — | 1 | 1 | 1 | 1 | 1 | 1 | 1 | 1 |
| 1. Fluidity of the paste | | | | | | | | | | | | |
| (a) Working quality | (1) | (1) | (1) | (1) | (2) | (2) | (2) | (2) | (2) | (1–2) | (2) | (2) |
| (b) Rate of flow in gram/30 min. | 0 | 0 | 0 | 0 | 68 | 64 | 53 | 44 | 36 | 55 | 60 | 34 |
| 2. Shelf life of the paste | | | | | | | | | | | | |
| Gelling time 120° C./h after preparation | 740" | 638" | 580" | 620" | 640" | 620" | 680" | 660" | 720" | 630" | 635" | 645" |
| Gelling time 120° C./30 d after p. | 738" | 630" | 570" | 620" | 645" | 630" | 675" | 660" | 725" | 635" | 630" | 645" |
| Gelling time 120° C./60 d after p. | 730" | 632" | 570" | 610" | 635" | 610" | 675" | 650" | 725" | 640" | 630" | 640" |
| 3. Tensile shear strength N/cm² (after setting) | 190 | 245 | 280 | 250 | 310 | 420 | 390 | 295 | 710 | 350 | 430 | 400 |
| 4. Tensile shear strength (climatic alternation) | 165 | 210 | 270 | 230 | 295 | 415 | 370 | 280 | 700 | 340 | 425 | 385 |
| 5. Loss of adhesion in salt spray | (3) | (3) | (3) | (3) | (4) | (4) | (4) | (5) | (4) | (5) | (4) | (4) |
| 6. Moisture absorption in the glue layer (wt. - %) | 7.6 | 7.2 | 6.3 | 6.8 | 3.8 | 3.2 | 2.8 | 4.3 | 2.5 | 4.5 | 3.2 | 3.0 |

(1) Kneadable at room temperature; no adhesion when paste is pressed against steel surface.
(2) Flows at room temperature; adheres when applied to or pressed against steel surface.
(3) Complete infiltration; complete lift-off of glue layer.
(4) 1 to 2 mm infiltration
(5) 2 to 3 mm infiltration; partial lift-off of glue layer.
A to D = Examples from prior art for comparison.

TABLE 2

| Amounts given are parts by weight | Examples for comparison | | EXAMPLES | | | | | | | | |
|---|---|---|---|---|---|---|---|---|---|---|---|
| | E | F | 11 | 12 | 13 | 14 | 15 | 16 | 17 | 18 | 19 |
| Polyester, COOH—terminated according to Example 2 | 45 | 45 | 40 | 42 | 40 | 40 | 39 | 40 | 40 | 39 | 41 |
| Paraffin, solidification point 56 to 58° C. | 1 | 1 | 1 | 1 | 1 | 1 | 1 | 1 | 1 | 1 | 1 |
| p-Phenylene bisoxazoline | 5 | 5 | 4.5 | 5 | 4.5 | 4.5 | 4.5 | 4.5 | 4.5 | 4.5 | 4.5 |
| Dioctylphthalate | 11 | — | 7 | 8 | 7 | — | — | 7 | — | — | — |
| Dioctyladipate | — | 11 | — | — | — | 5 | — | — | 5 | — | — |
| Chalk | 38 | 38 | 38 | 38 | 38 | 38 | 38 | 38 | 38 | 38 | 38 |
| Ethylene glycol diacrylate | — | — | 8 | — | — | — | — | — | — | — | — |
| Butanediol diacrylate | — | — | — | 5 | 8 | 10 | 16 | — | — | — | — |
| Butanediol dimethacrylate | — | — | — | — | — | — | — | 8 | 10 | — | — |
| Polyethylene glycol 200-dimethacrylate mol. wt. 200 | — | — | — | — | — | — | — | — | — | 15 | — |
| Ethoxylated bisphenol A dimethacrylate, formula II n = m-8-12 trade name Diacryl 103 ® by Akzo | — | — | — | — | — | — | — | — | — | — | 14 |
| Peroxide: 3,3,6,6,9,9-hexamethyl-cyclo-1,2,4,5-tetraoxanonane (as a 50% mixture in silica gel) | — | — | 1.5 | 1 | 1.5 | 1.5 | 1.5 | 1.5 | 1.5 | 2.5 | 1.5 |
| 1. Fluidity of the paste | | | | | | | | | | | |
| (a) Working quality | (1) | (1) | (2) | (2) | (2) | (2) | (2) | (2) | (2) | (2) | (2) |
| (b) Rate of Flow in grams/30 min. | 0 | 0 | 46 | 39 | 52 | 82 | 144 | 43 | 71 | 42 | 47 |
| 2. Shelf life of the paste | | | | | | | | | | | |
| Gelling time 120° C./h after preparation | 660" | 645" | 675" | 665" | 650" | 655" | 665" | 640" | 645" | 670" | 680" |

TABLE 2-continued

| Amounts given are parts by weight | Examples for comparison E | F | EXAMPLES 11 | 12 | 13 | 14 | 15 | 16 | 17 | 18 | 19 |
|---|---|---|---|---|---|---|---|---|---|---|---|
| Gelling time 120° C./30 d. after p. | 650" | 640" | 680" | 660" | 660" | 650" | 660" | 630" | 645" | 660" | 675" |
| Gelling time 120° C./60 d. after p. | 650" | 635" | 675" | 665" | 655" | 645" | 660" | 630" | 640" | 665" | 670" |
| 3. Tensile shear strength N/cm$^2$ (setting conditions, see p. 22) | 380 | 360 | 390 | 440 | 485 | 520 | 560 | 450 | 490 | 400 | 410 |
| 4. Tensile shear strength (climatic alternation) (N/cm$^2$) | 360 | 320 | 380 | 435 | 480 | 510 | 560 | 440 | 485 | 360 | 385 |
| 5. Loss of adhesion in salt spray | (3) | (3) | (5) | (5) | (4) | (4) | (4) | (4) | (4) | (5) | (5) |
| 6. Moisture absorption in the glue layer (wt. %) | 7.2 | 7.8 | 5.8 | 5.0 | 4.6 | 4.2 | 3.0 | 4.1 | 2.8 | 4.8 | 4.6 |

Footnotes (1) to (5): same as Table 1
Examples E and F are examples for comparison purposes.

TABLE 3

| Amounts given are parts by weight | Examples G | H | 20 | 21 | 22 | 23 | 24 | 25 | 26 | 27 | 28 |
|---|---|---|---|---|---|---|---|---|---|---|---|
| Polyester, COOH—terminated according to Example 2 | 39 | 39 | 39 | 39 | 39 | 39 | 39 | 39 | 39 | 39 | 39 |
| Paraffin, solidification point 56 to 58° C. | 1 | 1 | 1 | 1 | 1 | 1 | 1 | 1 | 1 | 1 | 1 |
| p-Phenylene bisoxazoline | 4 | 4 | 4.5 | 4.5 | 4 | 4.5 | 4.5 | 4.5 | 4.5 | 4.5 | 4.5 |
| Dioctylphthalate | 23 | 11 | 10 | 7 | — | 7 | — | 12 | 12 | 10 | 7 |
| Chalk | 33 | — | 33 | 33 | 35 | — | — | 33 | 33 | 33 | 33 |
| Talc | — | — | — | — | — | 40 | — | — | — | — | — |
| Heavy spar | — | 45 | — | — | — | — | 45 | — | — | — | — |
| Diallylphthalate | — | — | 10 | — | — | — | — | — | — | — | — |
| Trimethylolpropane trimethacrylate | — | — | — | 5 | — | — | — | — | — | — | — |
| Trimethylolpropane triacrylate | — | — | — | — | 20 | — | — | — | — | — | — |
| Butanediol diacrylate | — | — | — | — | — | 8 | 10 | — | — | — | — |
| Neopentylglycol dimethacrylate | — | — | — | — | — | — | — | 10 | — | — | — |
| Hexanediol diacrylate | — | — | — | 10 | — | — | — | — | 10 | — | — |
| Tripropylene glycol diacrylate | — | — | — | — | — | — | — | — | — | — | 15 |
| Butanediol monoacrylate | — | — | — | — | — | — | — | — | — | 5 | — |
| Peroxide: 2,5-dimethyl-2,5-di(tert-butylperoxy)-hexine-3 | — | — | 2.5 | 0.5 | 1 | 0.5 | 0.5 | 0.5 | 0.5 | 0.5 | 0.5 |
| 1. Fluidity of the paste | | | | | | | | | | | |
| (a) Working quality | (2) | (1) | (2) | (2) | (2) | (2) | (2) | (2) | (2) | (2) | (2) |
| (b) Rate of flow in grams/30 min. | 40 | 0 | 89 | 112 | 123 | 62 | 64 | 49 | 79 | 96 | 52 |
| 2. Shelf life of the paste | | | | | | | | | | | |
| Gelling time 120° C./h after preparation | 830" | 760" | 680" | 605" | 600" | 620" | 630" | 675" | 640" | 645" | 690" |
| Gelling time 120° C./30 d. after p. | 820" | 755" | 680" | 600" | 600" | 620" | 625" | 670" | 640" | 645" | 675" |
| Gelling time 120° C./60 d. after p. | 810" | 750" | 675" | 590" | 590" | 625" | 620" | 670" | 635" | 635" | 685" |
| 3. Tensile shear strength N/cm$^2$ | | | | | | | | | | | |
| Setting conditions, see p. 22 | 180 | 270 | 340 | 490 | 745 | 360 | 460 | 435 | 450 | 340 | 355 |
| 4. Tensile shear strength (climatic alternation) | 165 | 260 | 330 | 485 | 735 | 345 | 455 | 425 | 450 | 320 | 335 |
| 5. Loss of adhesion in salt spray | (3) | (3) | (5) | (4) | (4) | (4) | (4) | (4) | (4) | (5) | (5) |
| 6. Moisture absorption in the glue layer %) | 7.4 | 6.9 | 5.6 | 2.9 | 2.6 | 3.3 | 2.8 | 2.7 | 2.6 | 3.1 | 3.4 |

Footnotes (1) to (5) same as Table 1.
G and H are examples given for comparison.

It will be understood that the specification and examples are illustrative but not limitative of the present invention and that other embodiments within the spirit and scope of the invention will suggest themselves to those skilled in the art.

we claim:

1. A thermosetting adhesive and sealant composition comprising:
    (a) 20 to 60 wt.-% of carboxyl-group-terminated polyesters with a glass transition temperature below 20° C.;
    (b) 2.0 to 12 wt.-% of polyoxazolines which contain at least 2 oxazoline groups per molecule, the polyoxazolines being suspended in the polyester;
    (c) 2 to 40 wt.-% of acrylic or methacrylic esters, of monovalent or polyvalent alcohols or allyl esters of polyvalent carboxylic acids including carbonic acid, or mixtures of these compounds;
    (d) 0 to 5 wt.-% of peroxides or aliphatic azo compounds as radical formers; and
    (e) 0 to 4 wt.-% of paraffin.

2. The composition of claim 1, wherein component (a) consists of polyesters which, on the statistical average, contain at least 2 carboxyl groups per molecule, and have acid numbers of 20 to 120 mg KOH/g.

3. The composition of claim 1, wherein the polyoxazoline is selected from the group consisting of p-phenylene bisoxazoline, m-phenylenebisoxazoline, tetramethylene bisoxazoline and a mixture thereof.

4. The composition of claim 1, wherein the wt.-% of component (a) is 25 to 55.

5. The composition of claim 1, wherein the wt.-% of component (b) is 3 to 8.

6. The composition of claim 1, wherein the wt.-% of component (c) is 3 to 30.

7. The composition of claim 1, wherein the wt.-% of component (d) is 0.2 to 3.

8. The composition of claim 1, wherein the wt.-% of component (e) is 0.5 to 2.

9. The composition of claim 1, wherein the wt.-% of component (f) is 1 to 50.

10. The composition of claim 4, wherein the wt.-% of component (b) is 3 to 8.

11. The composition of claim 10, wherein the wt.-% of component (c) is 3 to 30.

12. The composition of claim 11, wherein the wt.-% of component (d) is 0.2 to 3.

13. The composition of claim 12, wherein the wt.-% of component (e) is 0.5 to 2.

14. The composition of claim 13, wherein the wt.-% of component (f) is 1 to 50.

15. The composition of claim 2, wherein the polyesters have an acid number of from 30 to 70 mg KOH/g.

16. The composition of claim 1 further comprising: (f) 1 to 60 wt.-% with respect to the total amount of the components, of diluents and/or additives.

* * * * *